Patented June 21, 1927.

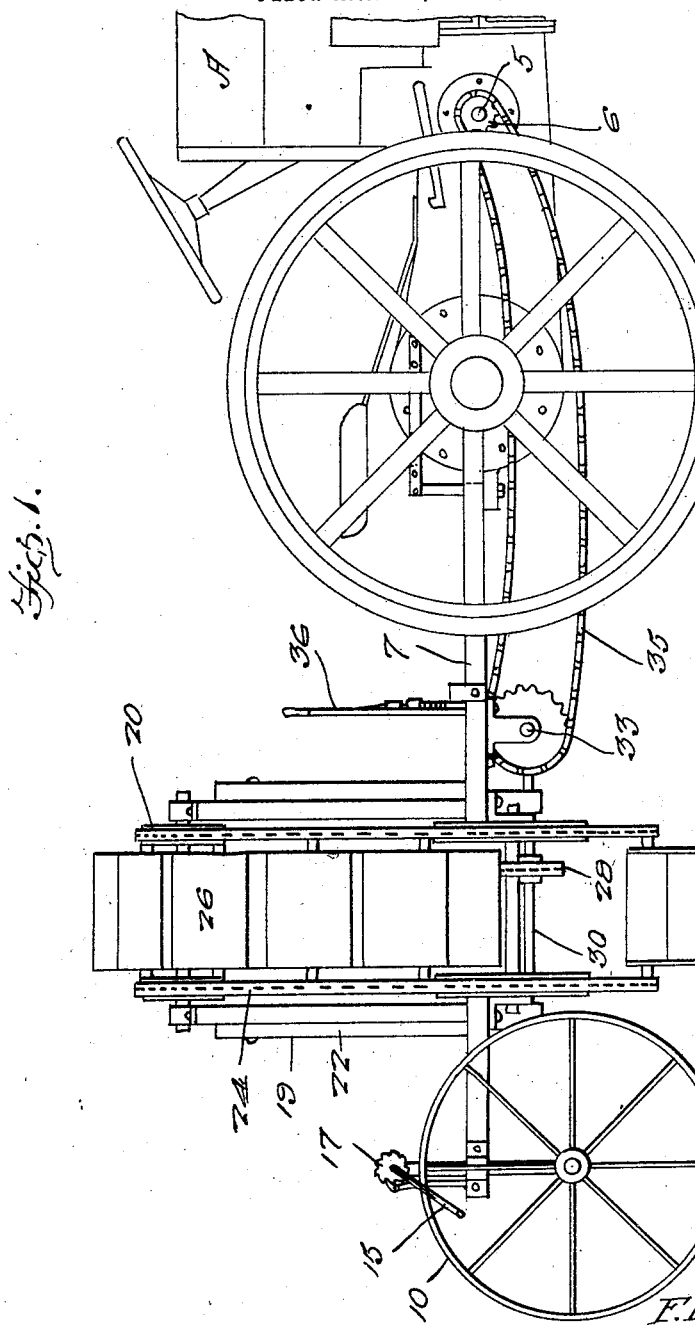

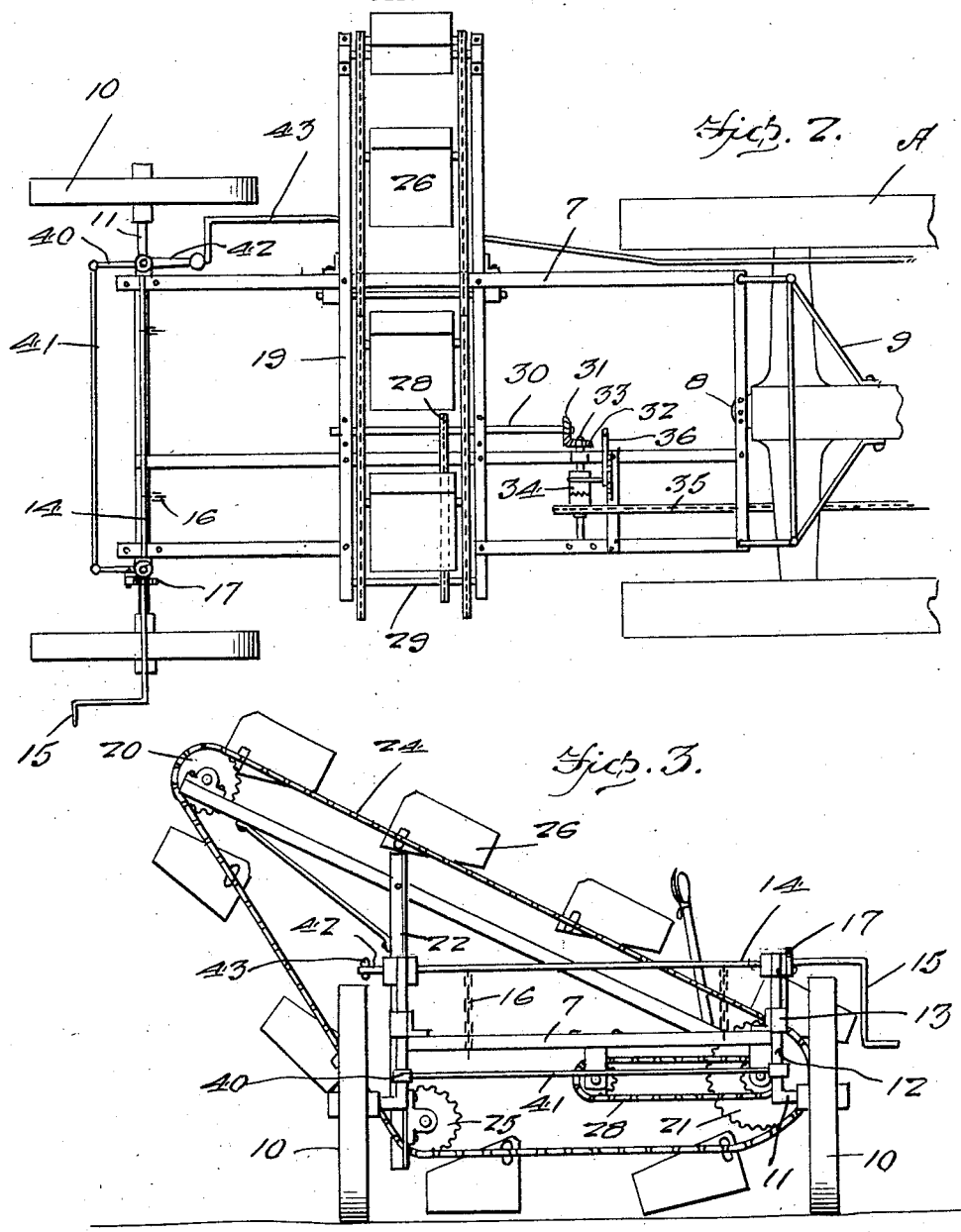

1,633,311

UNITED STATES PATENT OFFICE.

FRED E. BRASWELL AND SAMIEL T. RAY, OF GADSDEN, ARIZONA.

TRENCH-CLEANING DEVICE.

Application filed August 24, 1925. Serial No. 52,044.

The present invention relates to ditch cleaning machines and has for its principal object to provide a structure which may be attached to a Fordson tractor and moved along longitudinally with the ditch straddling the same, and operated to thoroughly and efficiently clean the ditch.

Another important object of the invention is to provide a device of this nature including a wheeled frame and a transverse structure supporting endless members having scraping scoops or the like thereon and operable to clean a ditch, the frame being provided with means whereby it may be raised or lowered so that the scrapers may be engaged with the ditch when desired.

A further important object of the invention is to provide a machine of this nature which is simple in its construction, economical to operate, strong, durable, not likely to easily become out of order, easy to manipulate, and otherwise well adapted to the purposes for which it is designed.

With the above and numerous other objects in view as will appear as the description proceeds, the invention resides in certain novel features of construction and in the combination and arrangement of parts as will be hereinafter more fully described and claimed.

In the drawing:

Figure 1 is a side elevation of the machine embodying the features of our invention showing the same attached to a Fordson tractor, Fig. 2 is a top plan view thereof, and Fig. 3 is a rear elevation thereof.

Referring to the drawings in detail, it will be seen that A designates the well known Fordson tractor which has the pulley shaft 5 thereof provided with a gear 6 instead of the usual pulley. The numeral 7 designates the frame of the machine which is attached to the axle housing of the Fordson tractor as is indicated at 8, a suitable bracing structure 9 being associated therewith. The two wheels 10 of the machine are mounted on axles 11 which have upwardly disposed extensions 12 passing through sleeves 13 on the rear ends of the frame. A rod 14 is journaled on the upper end of the extensions 12 and terminates at one end in an operating crank 15. Chains 16 are fixed to the rod 14 and to the rear portion of the frame 7 so that when the chains are wound about the rod 14 by rotating the latter by crank 15, said frame may be raised. By the rotation of the rod in the opposite direction it will be apparent that the frame may be lowered.

A suitable pawl and ratchet mechanism 17 is associated with the rod 14 so as to retain it in a position after having been rotated to wind the chains thereon. A supporting structure 19 is mounted transversely of the frame 7 and has journaled in its ends sprockets 20 and 21, the former being at the top of the frame and the latter at the bottom of the frame, it being noted that this supporting structure frame slants from one side downwardly to the other and is held in this inclined position by standards 22 vertically disposed on the frame 7. Chains 24 are trained over the sprockets 20 and 21 and also over the sprockets 25 at the bottom ends of the standards 22. Scrapers 26 are carried by the chains therebetween and when said chains are moved these scraper scoops will clean the bottom of a ditch as the machine moves therealong longitudinally, the wheels 10 running in the bottom of the said ditch as will also the wheels of the tractor A. A chain 28 drives the shaft 29 on which sprockets 21 are mounted. This chain 28 is driven by a shaft 30 having a beveled gear 31 on its end meshed with beveled gear 32 on a shaft 33 which has a clutch 34 incorporated therein.

A chain 35 drives one segment of the clutch, said chain being trained over the sprocket 6. The clutch 34 is operable in any suitable manner by a lever 36.

Cranks 40 extend from the extensions 12 of the axles 11 and a connecting rod 14 is attached thereto so that the cranks will move in unison. A crank 42 extends from one of the extensions and is operable by any suitable means 43 so that the rear wheels may be steered as will be desirable at curves in the ditch in which the machine is travelling as will be apparent.

It is thought that the construction, operation, and advantages of this invention will now be clearly understood without a more detailed description thereof. The present embodiment of the invention has merely been disclosed by way of example since in actual practice it attains the features of advantage enumerated as desirable in the above description of the invention.

It will be apparent that numerous changes in the details of construction and in the combination and arrangement of parts may be resorted to without departing from the spirit or scope of the invention as hereinafter claimed or sacrificing any of its advantages.

Having thus described our invention, what we claim as new is:—

A trench cleaning device of the class described including a frame, means on the front end of the frame for attaching the same to a tractor, a pair of axles, wheels journaled on the axles, extensions on the axles disposed upwardly, sleeves on the rear end of the frame for slidably and rotatably receiving the extensions, a rod journalled between the upper ends of the extensions and terminating at one end in a crank, chains attached to the rod and to the rear end of the frame, and means for rotating the extensions.

In testimony whereof we affix our signatures.

FRED E. BRASWELL.
SAMIEL T. RAY.